United States Patent
Hadinata et al.

(10) Patent No.: US 9,014,028 B2
(45) Date of Patent: Apr. 21, 2015

(54) IDENTIFYING AND TRANSITIONING TO AN IMPROVED VOIP SESSION

(75) Inventors: Martinianus B. T. Hadinata, Zurich (CH); Laurent Hayem, Paris (FR); Charles S. Lingafelt, Durham, NC (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 13/415,218

(22) Filed: Mar. 8, 2012

(65) Prior Publication Data

US 2013/0235731 A1    Sep. 12, 2013

(51) Int. Cl.
*H04L 29/06*    (2006.01)
*H04L 29/08*    (2006.01)

(52) U.S. Cl.
CPC .......... *H04L 67/148* (2013.01); *H04L 65/1083* (2013.01)

(58) Field of Classification Search
None
See application file for complete search history.

(56) References Cited

U.S. PATENT DOCUMENTS

| | | |
|---|---|---|
| 7,453,844 B1 | 11/2008 | Lee et al. |
| 2006/0088152 A1 | 4/2006 | Green et al. |
| 2006/0294245 A1 | 12/2006 | Raguparan et al. |
| 2007/0064684 A1* | 3/2007 | Kottilingal .................... 370/355 |
| 2007/0110031 A1 | 5/2007 | Szeto |
| 2007/0171913 A1 | 7/2007 | Luo et al. |
| 2008/0062997 A1 | 3/2008 | Nix |
| 2010/0080172 A1* | 4/2010 | Jin et al. .................... 370/328 |
| 2011/0063979 A1* | 3/2011 | Matthews et al. ............ 370/237 |

(Continued)

FOREIGN PATENT DOCUMENTS

| | | | |
|---|---|---|---|
| WO | WO 2004013998 A3 | * | 4/2004 |
| WO | WO2007025161 A2 | | 3/2007 |

(Continued)

OTHER PUBLICATIONS

International Search Report and Written Opinion of the Japanese Patent Office issued May 7, 2013 re PCT application of International Business Machines Corporation, No. PCT/IB2013/050940, Filed Feb. 4, 2013.

(Continued)

*Primary Examiner* — Ayaz Sheikh
*Assistant Examiner* — Tarell Hampton
(74) *Attorney, Agent, or Firm* — Patrick J. Daugherty; Driggs, Hogg, Daugherty & Del Zoppo Co., LPA

(57) ABSTRACT

An additional session is established for voice over internet protocol communication between a pair of endpoints in a network, wherein a current session is already established between the endpoints and is currently used for data packet communication between endpoints. Qualities of each of the sessions for voice over internet protocol communication are assessed and compared, and the endpoints signaled to select the session having the higher assessed quality as a current session for further data packet communication between the endpoints, and to remove the lower quality session from use as a session for the further data packet communication between the endpoints, or to use the lower quality session as a secondary session for data communication between the endpoints. More particularly, the assessed qualities of each of the current and additional sessions meet a basic requirement defined to provide voice over internet protocol data packet communication between the endpoints.

21 Claims, 2 Drawing Sheets

(56) References Cited

U.S. PATENT DOCUMENTS

2011/0317667 A1 12/2011 Li et al.
2013/0250797 A1* 9/2013 Itoh .............................. 370/252

FOREIGN PATENT DOCUMENTS

WO 2008097580 A1 8/2008
WO 2011017804 A1 2/2011

OTHER PUBLICATIONS

British Examination Report under Section 18(3) issued Sep. 18, 2014 re Application No. GB1415490.0 of International Business Machines Corporation.

GB IPO Examination Report issued Jan. 29, 2015 re GB application No. GB1415490.0 of International Business Machines Corporation.

* cited by examiner

IDENTIFYING AND TRANSITIONING TO AN IMPROVED VOIP SESSION

BACKGROUND

Embodiments of the present invention relate to Voice over Internet Protocol (VOIP) and other systems and applications that communicate voice as well as other audio and video data over network communications via data packets transformations.

VOIP systems and applications generally encode, convert or otherwise transform original audio and visual data into Internet Protocol (IP) data packets and communicate the IP data packets over the internet from a first (sending) endpoint to a second (receiving) endpoint that decodes the data packets back into an audio or video representation of the original audio/visual input data for the second endpoint. For each conversation between VoIP endpoints, a "session" or temporal link is established between the endpoints. Problems may arise as communicating packets are not guaranteed to flow along the same path during any session, and are not guaranteed to arrive such that the quality of a voice conversation or other audio/video is not impacted. For example, network congestion may cause a delay of packets to the point that the quality of a telephone call conversation achieved by a VoIP session is noticeably degraded.

BRIEF SUMMARY

In one embodiment of the present invention, a method for establishing and selecting session connections in response to VoIP session quality determinations includes establishing an additional session for voice over internet protocol communication between a pair of endpoints in a network, wherein a current session is already established between the endpoints and is currently used for the voice over internet protocol data packet communication between endpoints. A processing unit assesses and compares the quality of the voice over internet protocol communication between the endpoints over each of the sessions, and signals the endpoints to select the session having a higher assessed quality as a current session for further voice over internet protocol data packet communication between the endpoints. The processing unit also signals the endpoints to either remove the lower quality session from use as a session for the further voice over internet protocol data packet communication between the endpoints, or to use the lower quality session as a secondary session for data communication between the endpoints. More particularly, the assessed qualities of the voice over internet protocol communication of the current and the additional sessions each meet a basic requirement defined to provide voice over internet protocol data packet communication between the endpoints.

In another embodiment, a system has a processing unit, computer readable memory and a tangible computer-readable storage medium with program instructions, wherein the processing unit, when executing the stored program instructions, establishes an additional session for voice over internet protocol communication between a pair of endpoints in a network, wherein a current session is already established between the endpoints and is currently used for the voice over internet protocol data packet communication between endpoints. The processing unit assesses and compares the quality of the voice over internet protocol communication between the endpoints over each of the sessions, and signals the endpoints to select the session having a higher assessed quality as a current session for further voice over internet protocol data packet communication between the endpoints. The processing unit also signals the endpoints to either remove the lower quality session from use as a session for the further voice over internet protocol data packet communication between the endpoints, or to use the lower quality session as a secondary session for data communication between the endpoints. More particularly, the assessed qualities of the voice over internet protocol communication of the current and the additional sessions each meet a basic requirement defined to provide voice over internet protocol data packet communication between the endpoints.

In another embodiment, an article of manufacture has a tangible computer-readable storage medium with computer readable program code embodied therewith, the computer readable program code comprising instructions that, when executed by a computer processing unit, cause the computer processing unit to establish an additional session for voice over internet protocol communication between a pair of endpoints in a network, wherein a current session is already established between the endpoints and is currently used for the voice over internet protocol data packet communication between endpoints. The processing unit assesses and compares the quality of the voice over internet protocol communication between the endpoints over each of the sessions, and signals the endpoints to select the session having a higher assessed quality as a current session for further voice over internet protocol data packet communication between the endpoints. The processing unit also signals the endpoints to either remove the lower quality session from use as a session for the further voice over internet protocol data packet communication between the endpoints, or to use the lower quality session as a secondary session for data communication between the endpoints. More particularly, the assessed qualities of the voice over internet protocol communication of the current and the additional sessions each meet a basic requirement defined to provide voice over internet protocol data packet communication between the endpoints.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
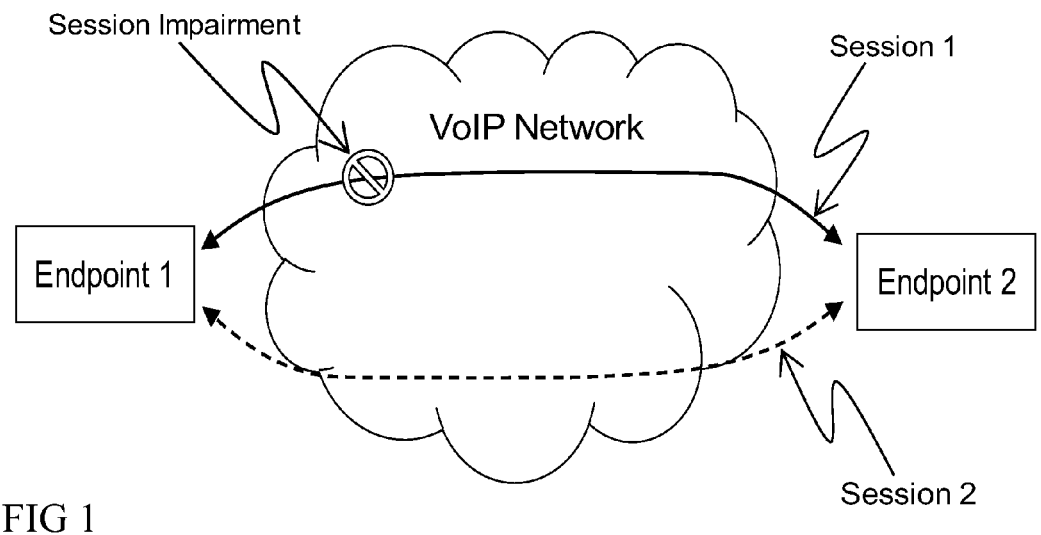
FIG. 1 is a diagrammatic illustration of an embodiment that establishes multiple session connections between a pair of endpoints for VoIP communications according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In conventional, prior art VoIP communications, one or more endpoint parties in a given conversation or other communication may be unaware of the quality problems experienced by other endpoints during a given session, or even by their own endpoint. For example, even though a given communications application or system may determine that the session connection is of sufficient quality to maintain VoIP communication, the quality of the session may diminish to a point that a person may hear a conversation but be unaware their replies to other parties are lost. They may not realize that they are missing some data packets, that some conversation words are being omitted from the conversation, or that the conversation is periodically freezing up and they (or another receiving party) are missing words, phrases or entire replies. Thus, under the prior art, if a session remains viable under application requirements but occasionally delays or drops data packets, the information conveyed may become of poor quality. In one aspect, dropping the wrong packet or group of packets may change a perceived conversational content, rendering a message conveyed wrong, untrustworthy, corrupted, misinterpreted or misunderstood. This may continue until one party finally realizes that they are missing content. There is no overt notice of this quality degradation of a session under the prior art if the session otherwise meets system or application requirements, but instead this low quality must be inferred via analyzing the resultant conversational content. Curing the degradation of the session generally requires a person to manually disconnect and reconnect to the conversation or to the conference call. In some cases, a person will not become aware that their VoIP session quality is poor enough to cause inaccuracies, causing a miscommunication of the conversational content between the endpoint parties.

FIG. 1 is a diagrammatic illustration of an embodiment of the present invention, wherein multiple sessions are established between a pair of endpoints for VoIP Network communications. Thus, if a conversation via Session 1 experiences a session impairment that degrades the quality of the VoIP communication, the embodiment switches some or all of the conversation data traffic to the alternative Session 2. Such embodiments obviate problems that may arise when the established Session 1 degrades to a point that affects the conversation, but not enough to terminate the session under the prior art. Although the assessed quality may be high enough to maintain the Session 1 connection in view of conventional system requirements (for example, audio data packets are being transmitted at a sufficient rate and number that a VoIP system application determines the session connection is good), communicating packets are not guaranteed to flow along a same path during Session 1 communications, and are not generally guaranteed by VoIP applications to arrive such that the quality of a resultant voice conversation or other audio/video is not impacted. Network congestion may cause a delay of packets to the point that the quality of a telephone call is noticeably degraded: for example, adding between 375 and 425 milliseconds to the latency of the packets transiting between the Endpoints 1 and 2 may not cause a conversation to fail over the VoIP Network, but may negatively impact the conversation audio/video data, perhaps causing gaps or pauses in received audio/video data not present in the original encoded content. Such network impairments may be temporal, starting and stopping with no relationship to the start and stop of the VoIP session, and may be in only one or in both directions. If the system is providing conference calling, the degradation may be to one or more parties, but not to all parties of the conference.

In contrast to the prior art, embodiments of the present invention compare the quality of Sessions 1 and 2 and switch to the better quality session, improving the quality of the resultant VoIP conversation between the Endpoints when the lower quality session otherwise still meets basic requirements defined by a system application to provide VoIP communication, but wherein the impairment to the Session 1 results in lower quality VoIP communications (for example, occasional dropped words, frozen video images, etc.) than the other available Session 2. More particularly, the quality of each session is high enough to conduct VoIP communication, wherein prior art systems and applications would otherwise maintain use of Session 1, and wherein the impact of the impairment to Session 1 may be unnoticed or undetectable by an endpoint user. By maintaining multiple, additional sessions, VoIP conversations or audio/video data streams may be automatically moved to better/best quality sessions (resulting in improved IP packet transmissions) in embodiments of the present invention before the conversation/stream experiences a noticeable decline in quality, accuracy, etc.

Figure 2:
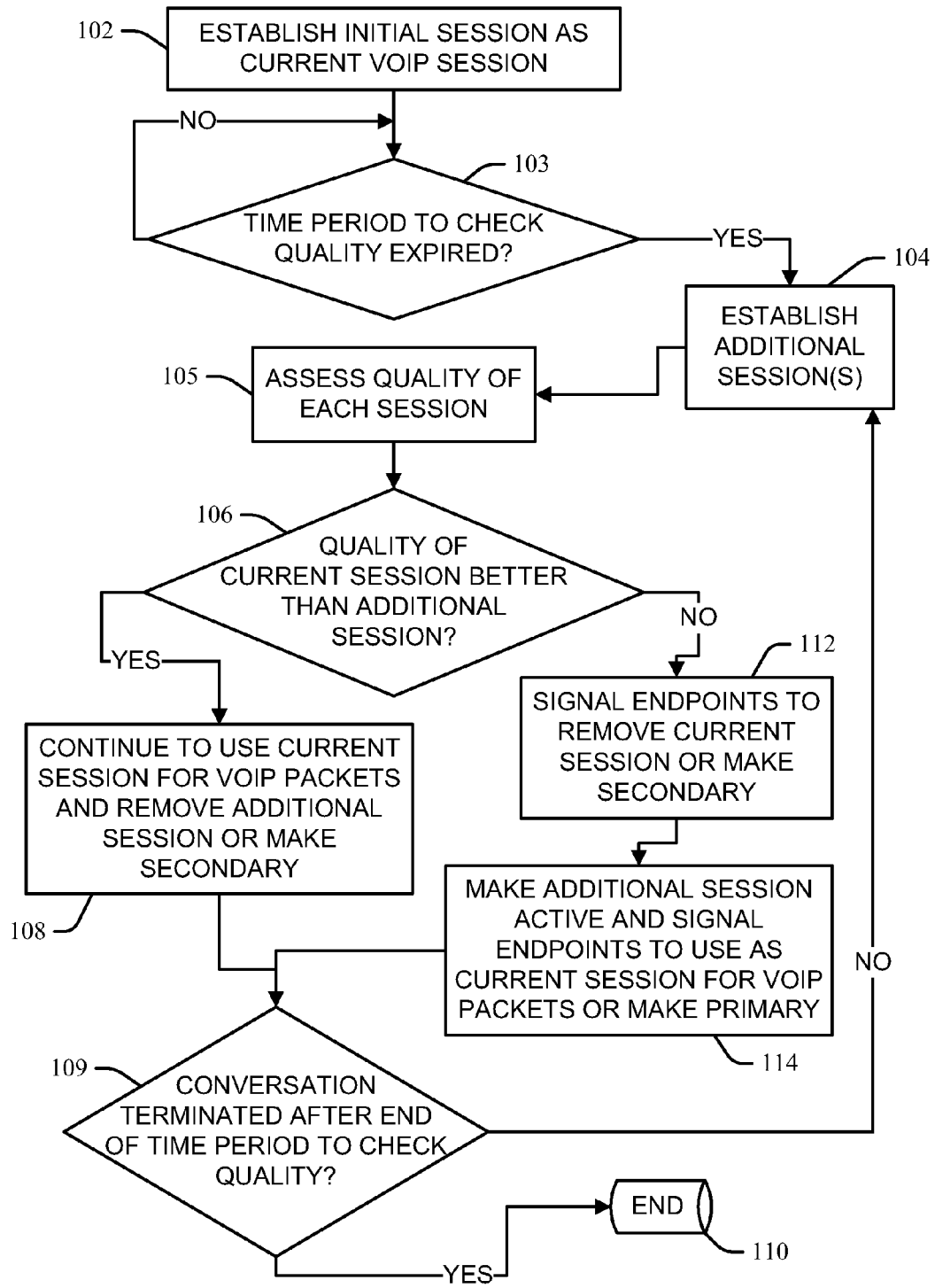
FIG. 2 is a block diagram illustration of an embodiment of a method, process or system for establishing and selecting additional session connections in response to VoIP session quality determinations according to the present invention.

FIG. 2 illustrates an embodiment of the present invention. At 102 an initial session is established as a current session for use in Voice over Internet Protocol (VoIP) communication over the internet or other network environment between a pair of endpoints. The VoIP communication may comprehend a two-way audio or video conversation between the endpoints, transmitting Internet Protocol (IP) data packets comprising audio or audio-visual information that may have been encoded, converted or otherwise transformed from original input comprising spoken words, music, movie, camera or video content comprising audio and video content, etc. At each receiving endpoint, the IP data packets are decoded, converted or otherwise transformed back into an audio or video representation of the original audio/visual input. Embodiments may also be practiced with one-way communication, wherein only one of the endpoints encodes and sends, and the other only receives and decodes, etc.

After expiration at 103 of a time period selected as or determined to be sufficient to test the quality of the current use session connection, at 104 at least one more additional session is established for VoIP communication between the endpoints. At 105 a quality of each of the current and additional sessions is assessed with respect to transmitting and receiving the encoded audio or video packets between the endpoints, and the assessed qualities of the sessions are compared at 106. If the currently-used session has the better/best quality of the compared assessed qualities of the sessions, then at 108 the conversation continues to use the current session for transmitting and receiving the encoded audio or video packets between the endpoints (either exclusively, or as a primary one of a plurality of the available, established sessions), and at least one or lesser quality additional session is removed from selection for use for the VoIP communication, or as a selectable primary option for said VoIP communication between the endpoints. If instead at 106 the (or one of the) additional session(s) has a better quality than the current (primary) session, then at 112 the current session is removed as the active session for current VoIP communications or is made a secondary session, and at 114 the additional session having the better/best quality connection is made active and the endpoints are signaled to use the additional session instead as the current session, or as the primary session, for further VoIP communication between the endpoints, thereby moving audio/video IP packet data transmissions to the newly-selected best/better additional session as a sole or primary session.

Embodiments may remove the lower/lowest quality session as an option for subsequent use in the VoIP communications at 108 or 114, wherein the endpoints are signaled to remove their connections to said lowest/lower quality. More particularly, in some embodiments of the present invention, only one session is used at a time in executing the VoIP communications between the endpoints, and the lesser/least quality session is unselected from use and terminated, either as a function of its lower/lowest quality status determination at 106, or in some embodiments if its quality is below a basic, minimum VoIP threshold quality level.

Alternatively, embodiments may retain said lower/lowest quality sessions at 108 or 114 for use with the better/best session, particularly if it still meets a basic, minimum VoIP threshold quality level defined by a system application to provide VoIP communication; the quality is still high enough wherein VoIP communication impacts would be unnoticed or undetectable by an endpoint user, just lower than the quality of the other session selected at 106. In some embodiments, the lower/lowest quality session is held open or otherwise maintained and used for secondary communications, for example to handle non-audio/video IP packet data transmission not sensitive to impairments to the same degree as the audio/video IP packet data. Moreover, in some embodiments, more than one session may used for the VoIP communications, with the session having the best/better quality session selected for primary audio/video IP packet data use, and the other less/least quality session used for occasional, redundant or otherwise secondary audio/video IP packet data use to support the primary functions of the best/better quality session. Thus, embodiments of the present invention may hold open two or more of the established session connections, and selectively and/or simultaneously send packets into each of a plurality of established session connections, for example duplicating the IP packets for additional reliability (sending same packet twice), or dividing the flow between the sessions to reduce latency of the flow and improve reliability.

If at the expiration at 109 of a time period selected/determined to test the quality of the currently selected session(s), the conversation has not ended at 110, then the process/system loops back to 104 to establish one or more new additional sessions in replacement of the lesser/least quality session determined via the comparison at 106. This may be an automatic process at 104, driven by identification of any session at 106 as having a lower/lowest quality. Alternatively, the decision to create a new session may be predicated on determining at 106 that the assessed quality of the lower/lowest quality session is also below a minimum threshold quality level. By continually or iteratively establishing additional sessions, VoIP conversations or audio/video data streams may be more easily and automatically moved to better/best quality sessions before the conversation/stream experiences a noticeable decline in quality, accuracy, etc.

Comparing or determining session quality at 106 may be accomplished using a variety of methods. In some embodiments, a signal with known attributes (amplitude profile, digital data, noise level, complexity, frame status, dimensionality, data type, specific floating or fixed-point, specific integer, etc.) is sent from one endpoint and compared to the signal actually received by the other endpoint via each of the compared, available sessions, wherein the session that fails to convey one or more of the known attributes of the signal, or that conveys a lesser quality signal with respect to the known attributes, may be deemed lower quality.

Embodiments may assess the abilities of each session to transmit and/or receive audio/video IP packet data, for example by counting the number or percentage of delayed VoIP packets received or otherwise determine packet inter-arrival times for each session, or count the number or determine the percentage of missing VoIP packets, and thereby choose the session at 106 with the better/best of the observed/assessed values. In some embodiments, the better/best quality session is identified by having values exceeding the assessed values of the other sessions by a threshold amount. For example, comparing inter-arrival times for packets for different sessions may indicate that one session is experiencing a greater increase in the percentage of delayed packets than that observed for another session (which may be indicative of increasing network congestion), and thus some embodiments may choose the session with the lower increase in the assessed percentages of delayed packets.

A wide variety of degradation criteria and applications may be practiced, in one aspect selected as a function of location and cultural expectations: for example, clients in a developing world country or location may have lower realistic expectations of attainable quality in VoIP conversations, and thus may tolerate greater disruption or degradation in the session performance via the application of higher thresholds than those used for triggering a switch in a more developed location having more robust infrastructure options (in one aspect, based on a lower expectation that another session will actually perform better than the one currently selected). A system administrator may also wish to minimize session switching, for example to minimize burdens on system resources dedicated to session assessments and switching.

Accordingly, some embodiments may require that the assessed quality of one session exceed that of another session by a minimum quality difference threshold before selecting and switching to a new (primary) session as a better/best session at 106. Thus, embodiments may choose one session as better than another only if their respective assessed average inter-arrival times, numbers of missing VoIP packets, etc., differ by at least a specified minimum quality difference threshold from the same assessed quality for another session. Quality assessment and threshold examples include discrete determined numbers of packets missing or delayed packets, as well as their relative percentages of total packets transmitted by a given session. Examples of threshold percentages include margins of difference of 5%, 10%, 40%, 50%, 65%, etc., between respective assessed percentages of delayed packets, missing packets, packets with increased inter-arrival times (for example, those having a latency ranging from 375 to 425 milliseconds) over the percentage determined for the other session. However, the above examples are illustrative but not exhaustive, and it is apparent to one skilled in the art that any other assessed value, percentage may also be selected and used to meet user or system requirements in distinguishing between sessions that otherwise meet minimum VoIP system or application requirements.

Embodiments may be used in a multi-party conference call, wherein a conference calling system may be configured to periodically test and reconfigure the VoIP session for the participants (at 103, 104, 105 and/or 106 of FIG. 2). Some embodiments utilized for large data content transmissions such as VoIP audio conversations, video streams, web casts, etc., buffer the transmitted content data stream in receiving endpoints in order to provide for smoother content creation at the receiving endpoints. Such embodiment may take advantage of the buffering mechanisms to switch to a better session while continuing to play/stream content out of the buffer to the endpoint user, enabling the embodiment to transmit/produce the resultant content seamlessly, without perceived interruption, to the endpoint user during a session switch, and hence the user may not even be aware of a switch between sessions.

As discussed above, embodiments of the present invention may use only one of the established sessions at a time, or also use multiple sessions in combination as needed. For example, in streaming application embodiments such as for a video or audio web-casts, if the quality of a currently-used session is such that it is not sufficient to maintain a desired play-out rate, this could be detected (at 103, 104 and/or 106 of FIG. 2) and another additional session set up and used to increase the parallelism (and thus the aggregate capacity) of the flow.

Selections of sessions at 106 may also cause sessions to be established along a certain path or with certain characteristics. In one example, standard internet protocols may be used at 108, 112 or 114 to specify that the packets associated to the better or primary session determined at 106 are marked to have higher priority, or to use the Resource Reservation Protocol (RSVP), a transport layer protocol designed to reserve bandwidth resources across a network along the path for an integrated services internet session, wherein the other, lesser/least quality session path is used for non-priority or non-RSVP packet data. The other, lesser/least quality session path identified at 106 may also be utilized to transfer non-VoIP packet traffic, with the better/best session used only for priority voice, audio or video traffic packets.

Figure 3:
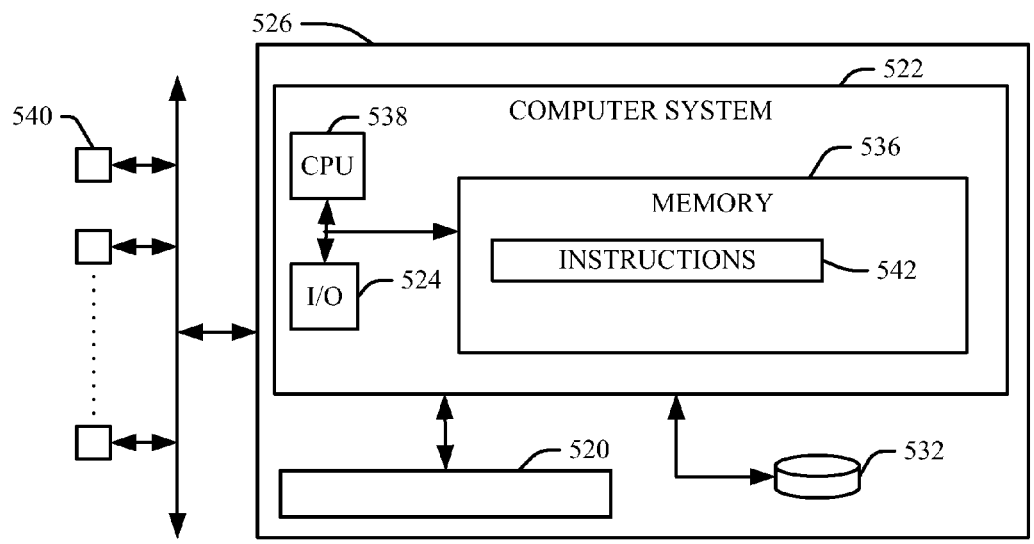
FIG. 3 is a block diagram illustration of a computerized implementation of an embodiment of the present invention.

Referring now to FIG. 3, an exemplary computerized implementation of an embodiment of the present invention includes a computer system or other programmable device 522 in communication with VoIP endpoints 540. Instructions 542 reside within computer readable code in a computer readable memory 536, or in a computer readable storage system 532, or other tangible computer readable storage medium that is accessed through a computer network infrastructure 526 by a processing unit (CPU) 538. Thus, the instructions, when implemented by the processing unit (CPU) 538, cause the processing unit (CPU) 538 to establish and select additional session connections in response to VoIP session quality determinations as described above with respect to FIGS. 1 and 2.

Embodiments of the present invention may also perform process steps of the invention on a subscription, advertising, and/or fee basis. That is, a service provider could offer to integrate computer-readable program code into the computer system 522 to enable the computer system 522 to establish and select additional session connections in response to VoIP session quality determinations as described above with respect to FIGS. 1 through 3. The service provider can create, maintain, and support, etc., a computer infrastructure such as the computer system 522, network environment 526, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computer device 522, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for establishing and selecting session connections in response to VoIP session quality determinations, the method comprising:
    establishing an additional session for voice over internet protocol communication between a pair of endpoints in a network, wherein a current session is already established for voice over internet protocol communication between the endpoints in the network and is currently used for voice over internet protocol communication data packet between the endpoints;
    determining by a processing unit a latency of voice over internet protocol communication audio data packets transiting between the endpoints over the current session, and a latency of voice over internet protocol communication audio data packets transiting between the endpoints over the additional session;
    comparing by the processing unit the latency of the audio data packets transiting between the endpoints over the current session to the latency of the audio data packets transiting between the endpoints over the additional session;
    signaling by the processing unit the endpoints to select one of the current session and the additional session having a lower value of the compared determined latencies by a difference ranging from 375 milliseconds to 425 milliseconds as a selected session for further voice over internet protocol data packet communication between the endpoints; and
    signaling by the processing unit the endpoints to remove another of the current session and the additional session that is not selected as the selected session from use as a session for the further voice over internet protocol data packet communication between the endpoints, or to make the another session of the current session and the additional session that is not selected as the selected session a secondary session for data communication between the endpoints; and
    wherein the determined latencies of the voice over internet protocol communication audio data packets transiting between the endpoints over the current and over the additional sessions each meet a basic requirement defined to provide good voice over internet protocol data packet communication between the endpoints.

2. The method of claim 1, further comprising:
    signaling by the processing unit the endpoints to make the selected session a primary session for communicating data packets between the endpoints comprising at least one of audio packet data, video packet data, original packet data and resource reservation protocol packet data; and
    signaling by the processing unit the endpoints to communicate data packets between the endpoints on the secondary session comprising at least one of non-audio packet data, non-video packet data, packet data that is redundant to the original packet data communicated on the primary session, non-resource reservation protocol packet data, and non-priority packet data.

3. The method of claim 1, further comprising:
    counting a number of missing packets of the voice over internet protocol communication data packets transiting between the endpoints over the current session, and a number of missing packets of the voice over internet protocol communication data packets transiting between the endpoints over the additional session;
    comparing the counted number of missing packets of the current session to the counted number of missing packets of the additional session; and
    signaling the endpoints to select one of the current session and the additional session that has a specified percent lower value of the compared, counted numbers of missing packets as the selected session for further voice over internet protocol data packet communication between the endpoints.

4. The method of claim 3, further comprising:
    counting a number of delayed packets of voice over internet protocol communication data packets transiting between the endpoints over the current session, and a number of delayed packets of voice over internet protocol communication data packets transiting between the endpoints over the additional session;

comparing the counted number of delayed packets of the current session to the counted number of delayed packets of the additional session; and signaling the endpoints to select one of the current session and the additional session that has a specified percent lower value of the compared, counted number of delayed packets as the selected session for further voice over internet protocol data packet communication between the endpoints.

5. The method of claim 4, wherein at least one of the specified percent lower value of the compared, counted numbers of missing packets, and the specified percent lower value of the compared, counted number of delayed packets, is a value selected from 5%, 10% 40%, 50% and 65%.

6. The method of claim 4, wherein each of the endpoints buffer the data packets transiting between the endpoints in the voice over internet protocol communication over the current session; and further comprising signaling by the processing unit the endpoints to switch to the selected session from the current session while continuing to decode and stream audio content from the buffered data packets transiting between the endpoints in the voice over internet protocol communication over the current session, wherein the streamed content transmits without perceived interruption to an endpoint user during the switch so that the endpoint user is not aware of the switch between sessions.

7. The method of claim 1, further comprising:

integrating computer-readable program code into a computer system comprising the processing unit, a computer readable memory and a computer readable tangible storage medium, wherein the computer readable program code is embodied on the computer readable tangible storage device and comprises instructions that, when executed by the processing unit via the computer readable memory, cause the processing unit to perform the steps of:

establishing the additional session for voice over internet protocol communication between a pair of endpoints in a network;

determining the latency of the voice over internet protocol communication audio data packets transiting between the endpoints over the current session, and the latency of the voice over internet protocol communication audio data packets transiting between the endpoints over the additional session;

comparing the latency of the audio data packets transiting between the endpoints over the current session to the latency of the audio data packets transiting between the endpoints over the additional session;

signaling the endpoints to select the one of the current session and the additional session having the lower of the compared determined latencies by a difference ranging from 375 milliseconds to 425 milliseconds as the selected session for further voice over internet protocol data packet communication between the endpoints; and signaling the endpoints to remove the another one of the current session and the additional session that is not selected as the selected session from use for the further voice over internet protocol data packet communication between the endpoints, or to make the another one of the current session and the additional session that is not selected as the selected session the secondary session for data communication between the endpoints.

8. The method of claim 7, wherein the processing unit, when executing the program instructions stored on the tangible computer-readable storage medium via the computer readable memory, further performs the steps of:

signaling the endpoints to make the selected session the primary session for communicating data packets between the endpoints comprising at least one of audio packet data, video packet data, original packet data and resource reservation protocol packet data; and signaling the endpoints to communicate data packets between the endpoints on the secondary session comprising at least one of non-audio packet data, non-video packet data, packet data that is redundant to the original packet data communicated on the primary session, non-resource reservation protocol packet data, and non-priority packet data.

9. The method of claim 7, wherein the processing unit, when executing the program instructions stored on the tangible computer-readable storage medium via the computer readable memory, further performs steps of:

counting a number of missing packets of the voice over internet protocol communication data packets transiting between the endpoints over the current session, and a number of missing packets of the voice over internet protocol communication data packets transiting between the endpoints over the additional session;

comparing the counted number of missing packets of the current session to the counted number of missing packets of the additional session; and signaling the endpoints to select one of the current session and the additional session that has a specified percent lower value of the compared, counted numbers of missing packets as the selected session for further voice over internet protocol data packet communication between the endpoints.

10. The method of claim 9, wherein the processing unit, when executing the program instructions stored on the tangible computer-readable storage medium via the computer readable memory, further performs steps of:

counting a number of delayed packets of the voice over internet protocol communication data packets transiting between the endpoints over the current session, and a number of delayed packets of voice over internet protocol communication data packets transiting between the endpoints over the additional session;

comparing the counted number of delayed packets of the current session to the counted number of delayed packets of the additional session; and signaling the endpoints to select one of the current session and the additional session that has a specified percent lower value of the compared, counted number of delayed packets as the selected session for further voice over internet protocol data packet communication between the endpoints.

11. The method of claim 10, wherein each of the endpoints buffer the data packets transiting between the endpoints in the voice over internet protocol communication over the current session; and wherein the processing unit, when executing the program instructions stored on the tangible computer-readable storage medium via the computer readable memory, further performs the step of signaling the endpoints to switch to the selected session from the current session while continuing to decode and stream audio content from the buffered data packets transiting between the endpoints in the voice over internet protocol communication over the current session, wherein the streamed content transmits without perceived interruption to an endpoint user during the switch so that the endpoint user is not aware of the switch between sessions.

12. A system, comprising:
a processing unit in communication with a computer readable memory and a tangible computer-readable storage medium;
wherein the processing unit, when executing program instructions stored on the tangible computer-readable storage medium via the computer readable memory:
establishes an additional session for voice over internet protocol communication between a pair of endpoints in a network, wherein a current session is already established for voice over internet protocol communication between the endpoints in the network and is currently used for voice over internet protocol communication data packet between the endpoints;
determines a latency of voice over internet protocol communication audio data packets transiting between the endpoints over the current session, and a latency of voice over internet protocol communication audio data packets transiting between the endpoints over the additional session;
compares the latency of the audio data packets transiting between the endpoints over the current session to the latency of the audio data packets transiting between the endpoints over the additional session;
signals the endpoints to select one of the current session and the additional session having a lower value of the compared determined latencies by a difference ranging from 375 milliseconds to 425 milliseconds as a selected session for a further voice over internet protocol data packet communication between the endpoints; and
signals the endpoints to remove another of the current session and the additional session that is not selected as the selected session from use as a session for the further voice over internet protocol data packet communication between the endpoints, or to make the another of the current session and the additional session that is not selected as the selected session a secondary session for data communication between the endpoints; and
wherein the determined latencies of the voice over internet protocol communication audio data packets transiting between the endpoints over the current and over the additional sessions each meet a basic requirement defined to provide good voice over internet protocol data packet communication between the endpoints.

13. The system of claim 12, wherein the processing unit, when executing the program instructions stored on the computer-readable storage medium via the computer readable memory, further:
signals the endpoints to make the selected session a primary session for communicating data packets between the endpoints comprising at least one of audio packet data, video packet data, original packet data and resource reservation protocol packet data; and
signals the endpoints to communicate data packets between the endpoints on the secondary session comprising at least one of non-audio packet data, non-video packet data, packet data that is redundant to the original packet data communicated on the primary session, non-resource reservation protocol packet data, and non-priority packet data.

14. The system of claim 12, wherein the processing unit, when executing the program instructions stored on the tangible computer-readable storage medium via the computer readable memory, further:
counts a number of missing packets of the voice over internet protocol communication data packets transiting between the endpoints over the current session, and a number of missing packets of the voice over internet protocol communication data packets transiting between the endpoints over the additional session;
compares the counted number of missing packets of the current session to the counted number of missing packets of the additional session; and
signals the endpoints to select one of the current session and the additional session that has a specified percent lower value of the compared, counted numbers of missing packets as the selected session for further voice over internet protocol data packet communication between the endpoints.

15. The system of claim 14, wherein the processing unit, when executing the program instructions stored on the tangible computer-readable storage medium via the computer readable memory, further:
counts a number of delayed packets of voice over internet protocol communication data packets transiting between the endpoints over the current session, and a number of delayed packets of voice over internet protocol communication data packets transiting between the endpoints over the additional session;
compares the counted number of delayed packets of the current session to the counted number of delayed packets of the additional session; and
signals the endpoints to select one of the current session and the additional session that has a specified percent lower value of the compared, counted number of delayed packets as the selected session for further voice over internet protocol data packet communication between the endpoints.

16. The system of claim 15, wherein each of the endpoints buffer the data packets transiting between the endpoints in the voice over internet protocol communication over the selected current session; and
wherein the processing unit, when executing the program instructions stored on the tangible computer-readable storage medium via the computer readable memory, further signals the endpoints to switch to the selected session from the current session while continuing to decode and stream audio content from the buffered data packets transiting between the endpoints in the voice over internet protocol communication over the current session, wherein the streamed content transmits without perceived interruption to an endpoint user during the switch so that the endpoint user is not aware of the switch between sessions.

17. An article of manufacture, comprising:
a computer readable hardware storage device having computer readable program code embodied therewith, the computer readable program code comprising instructions that, when executed by a computer processing unit, cause the computer processing unit to:
establish an additional session for voice over internet protocol communication between a pair of endpoints in a network, wherein a current session is already established for voice over internet protocol communication between the endpoints in the network and is currently used for voice over internet protocol communication data packet between the endpoints;

determine a latency of voice over internet protocol communication audio data packets transiting between the endpoints over the current session, and a latency of voice over internet protocol communication audio data packets transiting between the endpoints over the additional session;

compare the latency of the audio data packets transiting between the endpoints over the current session to the latency of the audio data packets transiting between the endpoints over the additional session;

signal the endpoints to select one of the current session and the additional session having a lower value of the compared determined latencies by a difference ranging from 375 milliseconds to 425 milliseconds as a selected session for further voice over internet protocol data packet communication between the endpoints; and signal the endpoints to remove another of the current session and the additional session that is not selected as the selected session from use as a session for the further voice over internet protocol data packet communication between the endpoints, or to make the another of the current session and the additional session that is not selected as the selected session a secondary session for data communication between the endpoints; and wherein the determined latencies of the voice over internet protocol communication audio data packets transiting between the endpoints over the current and over the additional sessions each meet a basic requirement defined to provide good voice over internet protocol data packet communication between the endpoints.

18. The article of manufacture of claim 17, wherein the computer readable program code instructions, when executed by the computer processing unit, further cause the computer processing unit to:

signal the endpoints to make the selected session a primary session for communicating data packets between the endpoints comprising at least one of audio packet data, video packet data, original packet data and resource reservation protocol packet data; and signal the endpoints to communicate data packets between the endpoints on the secondary session comprising at least one of non-audio packet data, non-video packet data, packet data that is redundant to the original packet data communicated on the primary session, non-resource reservation protocol packet data, and non-priority packet data.

19. The article of manufacture of claim 17, wherein the computer readable program code instructions, when executed by the computer processing unit, further cause the computer processing unit to further:

count a number of missing packets of the voice over internet protocol communication data packets transiting between the endpoints over the current session, and a number of missing packets of the voice over internet protocol communication data packets transiting between the endpoints over the additional session;

compare the counted number of missing packets of the current session to the counted number of missing packets of the additional session; and signal the endpoints to select one of the current session and the additional session that has a specified percent lower value of the compared, counted numbers of missing packets as the selected session for further voice over internet protocol data packet communication between the endpoints.

20. The article of manufacture of claim 19, wherein the computer readable program code instructions, when executed by the computer processing unit, further cause the computer processing unit to further:

count a number of delayed packets of voice over internet protocol communication data packets transiting between the endpoints over the current session, and a number of delayed packets of voice over internet protocol communication data packets transiting between the endpoints over the additional session;

compare the counted number of delayed packets of the current session to the counted number of delayed packets of the additional session; and signal the endpoints to select one of the current session and the additional session that has a specified percent lower value of the compared, counted number of delayed packets as the selected session for further voice over internet protocol data packet communication between the endpoints.

21. The article of manufacture of claim 20, wherein each of the endpoints buffer the data packets transiting between the endpoints in the voice over internet protocol communication over the current session; and wherein the computer readable program code instructions, when executed by the computer processing unit, further cause the computer processing unit to further signal the endpoints to switch to the selected session from the current session while continuing to decode and stream audio content from the buffered data packets transiting between the endpoints in the voice over internet protocol communication over the current session, wherein the streamed content transmits without perceived interruption to an endpoint user during the switch so that the endpoint user is not aware of the switch between sessions.

* * * * *